US010210627B1

(12) United States Patent
Vitsnudel et al.

(10) Patent No.: US 10,210,627 B1
(45) Date of Patent: Feb. 19, 2019

(54) IMAGE PROCESSING SYSTEM FOR DETERMINING METRICS OF OBJECTS REPRESENTED THEREIN

(71) Applicant: Amazon Technologies, Inc., Seattle, WA (US)

(72) Inventors: Ilia Vitsnudel, Mountain View, CA (US); Ilya Vladimirovich Brailovskiy, Even Yehuda (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/413,255

(22) Filed: Jan. 23, 2017

(51) Int. Cl.
  *G06T 7/60* (2017.01)
  *G06K 9/46* (2006.01)
  *G06K 9/66* (2006.01)
  *G06N 3/08* (2006.01)

(52) U.S. Cl.
  CPC ............. *G06T 7/60* (2013.01); *G06K 9/4628* (2013.01); *G06K 9/66* (2013.01); *G06N 3/08* (2013.01); *G06T 2207/20024* (2013.01); *G06T 2207/20081* (2013.01); *G06T 2207/20084* (2013.01); *G06T 2207/30196* (2013.01)

(58) Field of Classification Search
  CPC .......... G06T 7/60; G06K 9/4628; G06K 9/66; G06N 3/08
  See application file for complete search history.

(56) References Cited

U.S. PATENT DOCUMENTS

2015/0347820 A1* 12/2015 Yin .................... G06K 9/00221
                                                    382/118

OTHER PUBLICATIONS

Bell et al., "Learning visual similarity for product design with convolutional neural networks," Cornell University, published by SIGGRAPH 2015 in Aug. 2015, retrieved from the internet on Dec. 20, 2016, http://www.cs.cornell.edu/~kb, 10 pages.
Chopra et al., "Learning a Similarity Metric Discriminatively, with Application to Face Verification," Proceeding of Computer Vision and Pattern Recognition Conference, IEEE Press, 2005, retrieved from the internet on Dec. 20, 2016, http://yann.lecun.com/exdb/publis/, 8 pages.

* cited by examiner

*Primary Examiner* — Ruiping Li
(74) *Attorney, Agent, or Firm* — Davis Wright Tremaine LLP

(57) ABSTRACT

A computer system determines a metric for an input object, which could be an image of a person with the metric being measure of the person's body size, age, etc. A paired neural network system is trained on a training set of objects having pairs of objects each assigned a relative metric. A relative metric for a pair indicate which of the pair has the higher metric. A representative set of objects includes a known assigned metric value for each object. The trained paired neural network system pairwise compares an input object with objects from the representative set to determine a relative metric for each such pair, to arrive at a collection of relative metrics of the input object relative to various objects in the representative set. A metric value can be estimated for the input object based on the collection of relative metrics and those known metric values.

20 Claims, 7 Drawing Sheets

| Match Results for Input Image | | |
|---|---|---|
| Match # | Metric Value | Relative Metric |
| 1 | $M_1$ | M(Input Image) < M(RDS(1)) |
| 2 | $M_2$ | M(Input Image) < M(RDS(2)) |
| 3 | $M_3$ | M(Input Image) > M(RDS(3)) |
| 4 | $M_4$ | M(Input Image) < M(RDS(4)) |
| 5 | $M_5$ | M(Input Image) > M(RDS(5)) |
| ... | ... | ... |
| k | $M_k$ | M(Input Image) > M(RDS(k)) |

IMAGE PROCESSING SYSTEM FOR DETERMINING METRICS OF OBJECTS REPRESENTED THEREIN

BACKGROUND

There are some parameters, characteristics and metrics of an image or other data object that humans can innately discern where it would be difficult for a computer process to determine. In some applications, the solution is to provide more data to the computer and/or obtain additional manually determined data. An example of this is determining a body size suitable for a person based on an input image of that person. It may be that a fashion expert could look at one image of a person, in context, and determine approximately what size clothing would be appropriate for that person. However, that is not always easy and would require a dedicated fashion expert to be reviewing many, many images. One approach to computer-based sizing is to capture multiple images of the person, using very constrained requirements on how the images are taken, and include readings from a depth sensor, which is not typically available. For example, where a person is shopping online for clothing, they might not have access to a depth sensor. Another approach is to dispense with images entirely, or use them as an adjunct, and ask the user to make body measurements. This can be a hassle for users and so it might be desirable to be able to determine a body size of a person from a simple image.

BRIEF DESCRIPTION OF THE DRAWINGS

Various techniques will be described with reference to the drawings, in which.

DETAILED DESCRIPTION

Figure 1:
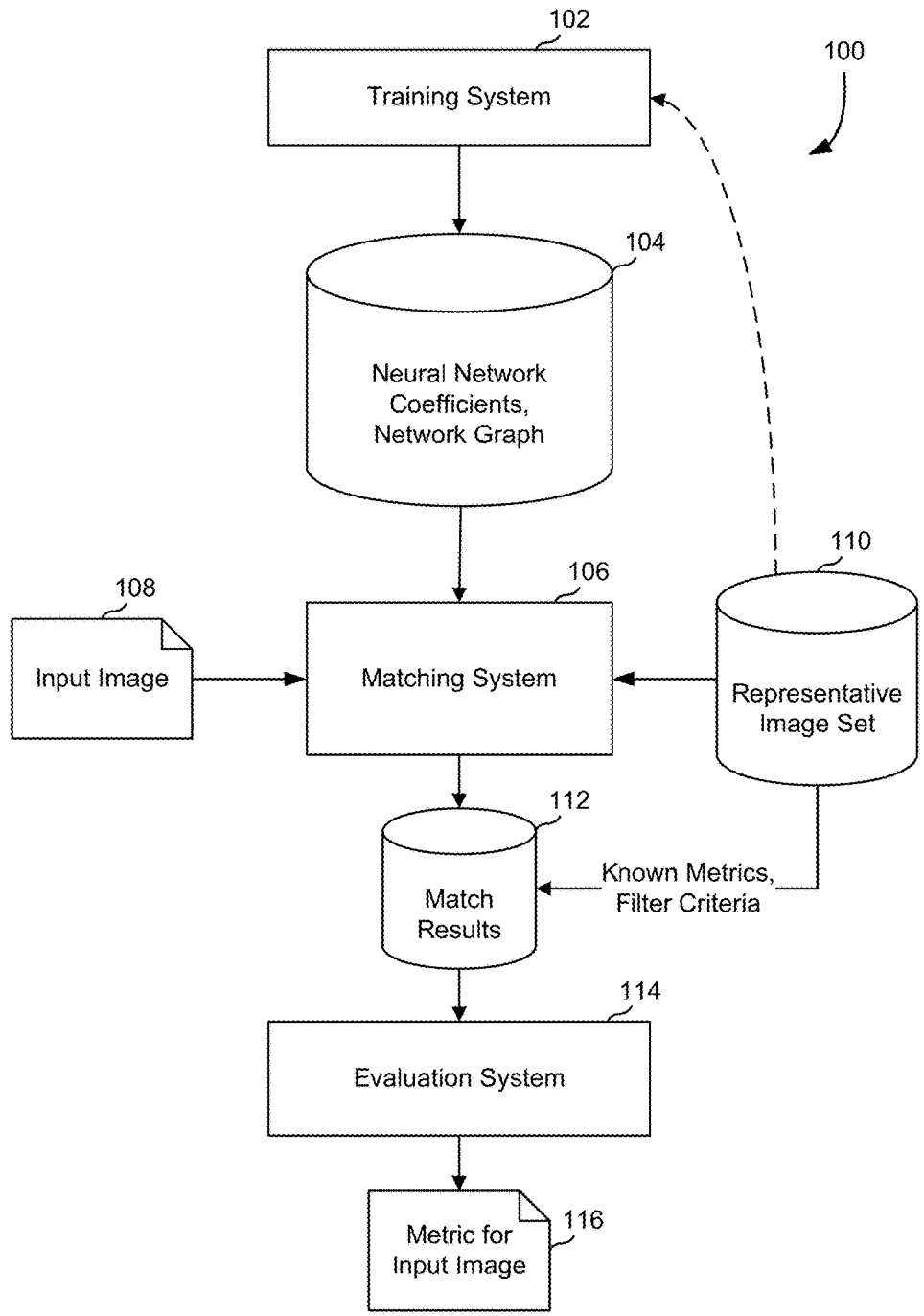
FIG. 1 illustrates a block diagram of an image processing system for determining metrics of objects shown in images.

As described herein, a computer-based system processes an image of a person and determines a likely body size of that person. More generally, the computer-based system processes an image or an object that is a data structure or computer-representable data object to determine a metric about that image or object. While many of the examples herein refer to the input as being an image, it should be apparent after reading this disclosure that other data structures or other computer-representable data objects might be the input instead. As an example, the input could be an image and the metric could be size, body size, age, gender, height, weight, etc. of a person depicted in the image. The body size might be some metric related to measurements of body parts and/or might be represented by a clothing size (e.g., a dress size from a standardized set of dress sizes). The metric can be described by, or converted to, or represented by, a numerical value that can be stored in computer memory. For simplicity, and without loss of generality, this metric might be assumed to be a nonzero number.

The metric for a given image might be known. For example, a tailor can capture an image of a person, then make extensive tape measure measurements of that person to definitively pronounce the dress size of that person, their inseam, their waist circumference, etc. These metrics can be stored in computer memory set aside for those metrics. Links or associations can be made in memory with a stored image of that person. The metric, or approximations thereto, can also be obtained in other ways such that systems and processes described herein work acceptably even if the stored metrics for an image or object are not actually the precise metrics.

For example, where the metrics are dress size, waist circumference, inseam, etc., the metrics for a given image might be arrived at by having the person depicted in the image enter into a computer interface their dress size, waist, leg length, etc. as actually measured or as reasonably guessed and that might be sufficient. It should be understood that for the purposes described herein, a deemed metric might be used that is not exactly equal to the actual metric (for example, a person's age is taken as being 31 when in fact a person is legally 33 years old). Thus, it should be understood that where an image or object is described as having a metric, that metric might be the actual, precise and correct metric or it might be a deemed metric that some process or procedure determined. Presumably, in some situations, exactness might not be required.

As an example, if a computer-based system is determining body size within one dress size of a depicted person's actual dress size, that may be satisfactory. It should be further understood that within the scope of this disclosure, when a metric is determined for a given input, it is a determined metric and not necessarily the exact metric of that input. For example, the computer-based system may determine, based on inputs, that a person depicted in an image is five foot, ten inches tall and store a record in a database, perhaps along with that image, a data field of "height=5' 10" in that record. Other computer systems, such as an online shopping application, might use that determined height as the height of the person, even if—for example—the person's actual measured height is 5' 11" as measured with a physical measuring system and the other computer system would use the recorded 5' 10" measurement without any ill effects. Unless otherwise specified, then, when reference is made, for example, to a person having a body size of 45, it should be understood that that is the body size determined by the computer-based system, which might or might not be exactly the person's actual body size.

The metric for an image might be unknown. Systems and processes described herein can be used to process data about the image to derive a metric for that image. For many purposes, the determined metric can be deemed to be the correct metric without ill effects.

For a pair of images, there can be a relative metric, known or unknown. A relative metric for a pair of images can be logically treated as a value that "points" to one image or the other, indicating which image has a higher metric (or is deemed to have a higher metric). It should be apparent from reading this disclosure that the relative metric could just as well point to the image having the lower metric of the two instead, so long as the label is consistent. In the case where two images have the same metric, or are deemed to have the same metric, there might be a third option for relative metric to indicate a "tie" or one or the other image could be arbitrarily assigned to be higher/lower than the other so that ties do not occur. In many cases, results will not likely be diminished by the fact of such arbitrary assignment, since the metrics are likely to be very close anyway in the case of ties.

As one example, suppose the images in a pair are designated image A and image B and the metric is body size. The relative metric might be represented in memory by a binary value "0" when the relative metric points to image A (meaning that a person in image A appears to have a larger body size than a person depicted in image B) and a binary value of "1" when the relative metric points to image B (meaning the person depicted in image A appears to have a smaller body size than the person depicted in image B). In the case of both appearing to have the same body size, one or the other binary value can be assigned. As should be apparent, with a binary value, the relative metric can represent which image has the larger body size or which image has the smaller body size, as that is just a convention that can be used within the system. In other words, a convention where "0" implies "A>B" and "1" implies "A<B" is just as valid as a convention where "0" implies "A<B" and "1" implies "A>B."

If the metrics for two images are known and are represented by numerical values, a processor can easily determine the relative metric, simply by comparing the magnitudes of the metrics of the two images. In systems and processes described herein, there are cases where a relative metric for a pair of images is known even though the metrics for both of the images are not available or not known. An unknown metric of an image can be determined using the systems and processes described herein.

For the case of images and a particular metric, first, a neural network system can be trained using a training set of image pairs. The training set might contain 10,000 or 20,000 or more, or fewer, image pairs. A given image might appear in more than one pair, such that one given image is paired with more than one other image in the training set. For each pair in the training set, there is a known relative metric that points to one image or the other, indicating which image has a higher metric, or is deemed to have a higher metric. The training set might be stored in computer-readable memory in a structure that contains the images, the pairings among the images and, for each pairing, the pair's relative metric value. In a specific embodiment, the relative metric value is a relative body size of a person depicted in an image.

The metrics for each of the images is not required to be available to determine the relative metric values. The relative metric values might be obtained from knowledge about the persons depicted in the images or might be obtained by a subjective process wherein a pair of images are displayed to a human evaluator and the human evaluator inputs whether the person depicted in one image of the pair appears to have a larger or smaller body size than the person depicted in the other image of the pair. Note that this can be generalized to other metrics and their relative metrics. For example, the evaluator might be shown two images and be asked to indicate which of the two images shows a younger person relative to the person in the other image, in which case the relative metric would be "older/younger" and then this training set would be used to determine a metric of "age" for various input images.

In addition to the training set, a representative image set is made available to the computer-based system and may be stored in a computer-readable memory. Each of the images in the representative image set preferably has an associated metric that might also be stored in memory in association with the images. Some images in the representative image set might also be images in the training set, but that need not be the case. The associated metrics for the images in the representative image set might be obtained by people submitting images of themselves along with their physically measured body size, their age, etc. In other embodiments, the associated metrics are determined in some automated process or reviewing process. In any case, the representative image set contains images for which metrics are known. It may be that the representative image set contains 500, 1,000 or some other number of images each having a known metric value. In an example, the associated metrics are body size values.

While not required, it may be that the number of images in the representative image is less than the number of images in the training set. For some applications, the number of input images is very large, such as millions, and might not be good images. The images might be taken using phone cameras by inexperienced photographers and the metric might need to be determined in real-time or shortly after obtaining the input image. These are some of the reasons why other approaches to assessing a metric from an image might not work.

For training the neural network system, a pair of images might be provided to a pair of branches of a neural network for a determination of their relative metric. The two branches might each operate using a common set of neural network parameters, which are adjusted during training if the outputs of the branches compute a result inconsistent with known results. For example, if the outputs of the branches are compared, the neural network can provide a relative metric for the pair of images. If that computed relative metric does not match a known relative metric for that pair of images, the common set of neural network parameters can be adjusted based on an error function. The edges of the neural graph and/or the weights of those edges can be adjusted to more closely align the neural network system's determination of relative metric with the recorded relative metric. In a specific example, there might be an image A and an image B where a human viewer had previously indicated that a person in image A is larger than a person in image B. If the neural network system determined that the person in image A is smaller than the person in image B, that would constitute a neural network error and training would provide feedback to train the network to reduce the errors.

The feature extractor might operate on extracted features and a convolutional neural network operates on extracted features at varying levels of resolution. Once trained, the convolutional neural network and a scoring neural network can be used to compare an input image with each of the images in the representative image set, or possibly a subset of the representative image set. Thus, the neural network system would select one image from the representative image set, compare it to the input image to determine a relative metric as to those two images, then repeat the process with other images in the representative image set. From this, the computer-based system would have a set of match results comprising the relative metrics and a stored metric for each of the images in the representative image data set.

An evaluation system could then process the set of match results to determine a determined metric for the input image. By using sufficient numbers of images in the representative image set, effects of outliers and hard to interpret images might be reduced.

By using this approach, metrics can be more efficiently determined. For example, it may be that the training set can be much smaller (even if all the images of the representative data set are counted as well) as compared to training a neural network to process an image and determine its metric directly. For example, training a neural network to receive an input image and output a body size of a person in the image directly might require many more than 20,000 images in the training set described above. As a result, a computer system for image or object processing can be made that is more efficient than other computer systems. This might reduce the amount of computation required to perform the processing, the amount of memory needed, the amount of time needed for training, and/or the amount of input training samples needed.

Another efficiency of such a computer system stems from the use of two branches of a neural network having the same neural network parameters. This allows for the neural network processing of the images in the representative image set to arrive at a set of scores output by the neural network for each of those images. Then, when an input image is processed, an output score is determined and then compared over the scores of the images of the representative image set.

One advantage of this is that the representative image set need only be processed in full once, and then those scores reused each time for an input image. Another advantage is that the scores can be filtered by various filter criteria and the representative image set need not be preprocesses when there are changes in the filter criteria. For example, suppose a person inputs their image, as well as their gender and height indicating that they are a tall male. Then, if there are also designations as to the images in the representative image set indicating the gender and height class of the person in the image, the representative image set can be filtered so that for the given input image, only the images of tall males are considered. Changing the filter criteria, such as to medium-height women, can be easily dealt with by taking a different subset of the scores for images in the representative image set. This saves on computing effort and resources, as reselection of filter criteria can be done without requiring recomputation of the scores. Additionally, using this approach, much more accurate results can be obtained.

Specific examples, with reference to the figures will now be described. In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates a block diagram of an image processing system 100 that can be used for determining metrics of objects shown in images. It should be understood that the teachings herein might be extended to data objects other than images. As one example of a metric of an image, image processing system 100 might be used to determine a body size for a person depicted in an input image, in which case the determined metric is body size. Image processing system 100 can be implemented using appropriately programmed computers having processors, program memory, data memory, etc. As shown, image processing system 100 comprises a network training system 102, a neural network data store 104 for storing network coefficients, a network graph, and other data that defines a trained neural network, a matching system 106 with inputs for an input image 108 and inputs from a representative image set data store (RDS) 110 and an output for match results. The match results are stored in a match results data store 112 that can be used by an evaluation system 114 to determine and output a metric 116 for the input image.

Image processing system 100 might be part of a larger system. For example, an ecommerce website used by a fashion retailer to sell clothing to online customers might request that the customer provide an input image of themselves. Image processing system 100 can then evaluate that image and determine a body size of the customer, possibly represented by a standardized or industry convention clothing size number, so that the fashion retailer's website can recommend clothing to the customer based on size. The ecommerce website can then complete an order without the customer having to guess or enter their body size or clothing size. This might also be useful for ordering gifts, where the clothing sizes of the gift recipient are not known to the gift sender but where the sender has an image of the recipient.

Neural network data store 104 might be populated with data derived from a training process. That data might be obtained by showing pairs of images to human evaluators and asking for their input as to a relative metric of the image pair. RDS 110 might comprise images each having a known metric. Each of the images (the pairs used for training, the representative images, and the input images) might comprise data structures indicative of pixel color values of pixels in a pixel array and thus are able to be stored in memory as data. The metrics of the representative images can be numerical values, also storable in memory as data. Also, the neural network coefficients can be represented by numerical values and the network graph represented by a graph data structure, all storable in memory as data.

Figure 2:
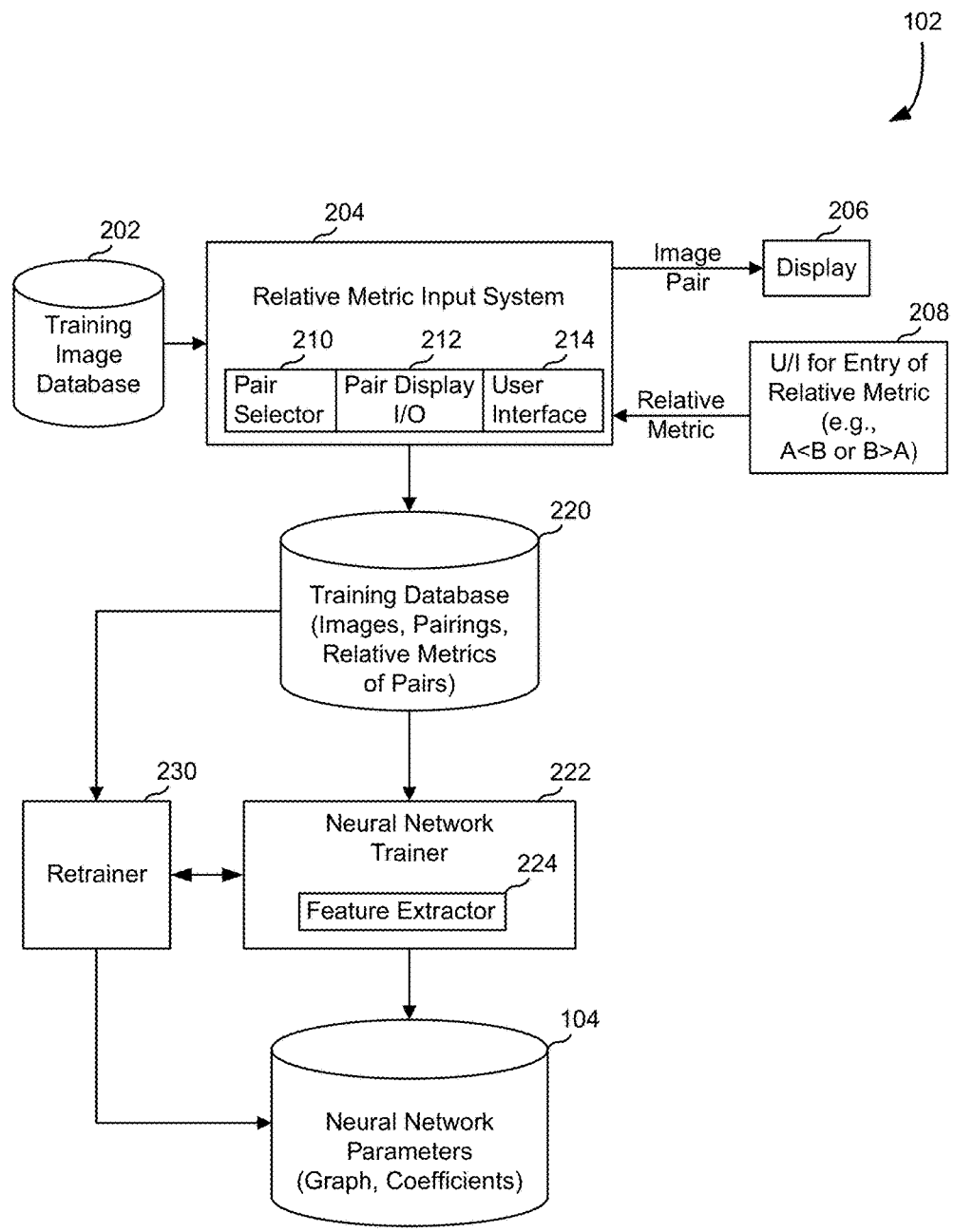
FIG. 2 illustrates a block diagram of a network training system for training a neural network that might be used in the image processing system of FIG. 1.

FIG. 2 illustrates a block diagram of network training system 102. As shown there, a relative metric input system 204 operates on a training image database 202, presents image pairs for display on a display 206 and receives user inputs from a user interface 208. Display 206 and user interface 208 might be implemented as a remote computer system used by a person to provide relative metrics. For example, a remote user might be a researcher, evaluator, or a person given the task of viewing images and providing relative metrics. There might be client software that downloads image pairs, displays them, waits for user input, and uploads the user selections.

Relative metric input system 204 might comprise a pair selector 210, a pair display input/output module 212, and a user interface module 214. It should be understood that these elements can each be implemented by dedicated hardware and/or be implemented as structures of data and program code such that, when executed by a processor, perform the described function and embody the structure needed to perform some operations.

In operation, relative metric input system 204 accesses training image database 202 to obtain images, pair selector 210 selects two of the images, pair display input/output module 212 generates data (such as HTML) representing a display of the pair of images, outputting to display 206, while user interface module 214 receives relative metric selections from user interface 208 and output results into a training database 220. In this manner, training database 220 can be populated. In terms of data structures, training database 220 might contain images stored as data (or pointers to images stored elsewhere, such as in training image database 202), listings of which images were paired with which images, and the relative metrics for pairs of images. In some embodiments, there is no requirement that any given image be used in only one pairing and in some embodiments there is no requirement that each image be used in the same number of pairs as other images. With the relative metrics, it would be known which of the pair of images has the greater metric. Where the relative metrics and metrics of images relate to characteristics of persons depicted in the images, the training images might be images of training image persons.

In some embodiments, a requirement is enforced that circular pairs are not created (e.g., a pair of image A and image B, a pair of image B and image C, and a pair of image A and image C), while in others circular pairs are allowed, but are consistency checked (e.g., so that the relative metrics do not show that A>B, B>C, and C>A), and in yet other embodiments, there is no requirement that circular pairs exhibit relative metric consistency. In the latter case, this might occur where the metrics for A, B and C are very close and the three pairs are shown to different people. If such a case occurs where there are circular relative metrics (i.e., A>B>C>A), it might not have any adverse effects, considering that those three images have similar metrics.

A neural network trainer 222 that includes a feature extractor 224 processes the data from training database 220 to derive neural network parameters (e.g., graph, coefficients, etc.) that are then stored in neural network data store 104. A retrainer 230 considers data from training database 220 and outputs from neural network trainer 222 to determine if the neural network is sufficiently trained to correctly process image pairs and adjusts the neural network parameters accordingly. In this manner, retrainer 230 provides for iterative training of the neural network. Retrainer 230 might run relative metric input system 204 over the training set without using knowledge of the relative metrics of the image pairs in the training set and compare the relative metric outputs to the known relative metrics. To the extent there are differences between what is output and what was expected as an expected output, these can be treated as errors or losses that are used to adjust the neural network parameters to refine the accuracy.

Feature extractor 224 parses an image into image features, such as by using a convolutional feature extraction process. Feature extractor 224 generates the features that will be used for the assessment of the metric in later parts of the system. The feature extractors described herein can be implemented, by way of example, as convolutional neural networks. In such cases, retrainer 230 might perform end-to-end training, adjusting the neural network parameters of the convolutional neural network of the feature extractors.

Figure 3:
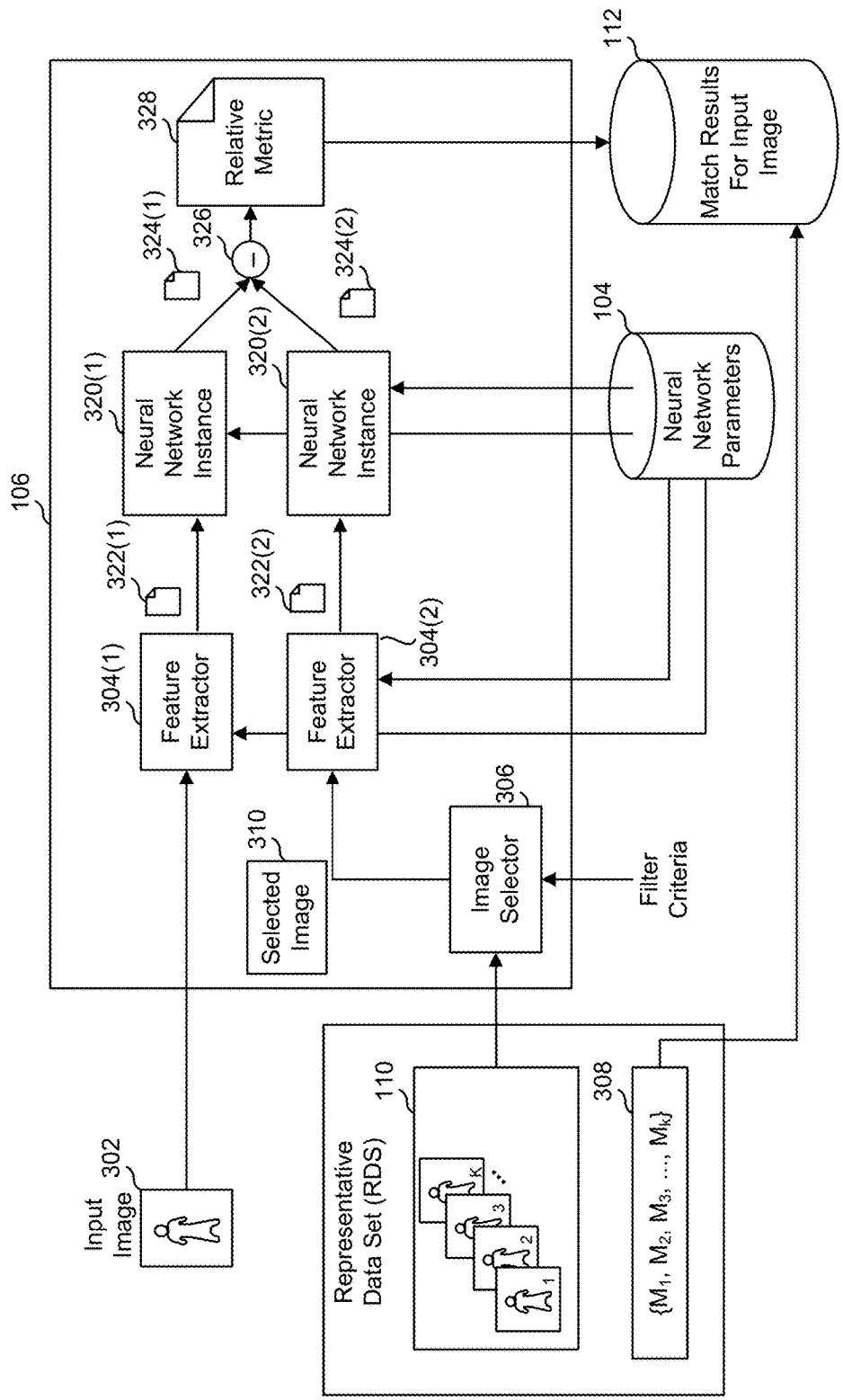
FIG. 3 illustrates a block diagram of a matching system that might use the neural network of FIG. 2 in matching an input image against a representative data set of images having known metrics.

FIG. 3 illustrates a block diagram of matching system 106 in greater detail. As shown, matching system 106 operates on an input image 302 and images from RDS 110 and corresponding known metrics 308. In operation, matching system 106 applies input image 302 is to a feature extractor 304(1) and an image selector 306 selects images from RDS 110 and provides a selected image 310 to a feature extractor 304(2). The corresponding known metrics 308 might be from actual body measurements.

Each of the feature extractors 304 provides a respective feature set 322(1), 322(2) to a respective neural network instance 320(1), 320(2). For example, feature extractor 304(1) operates on input image 302 to derive, using convolutions, subsampling, and the like, various arrays and other data elements about content of input image 302 as feature set 322(1) to neural network instance 320(1). Neural network instance 320(1) determines, from feature set 322(1), what output value 324(1) to output according to its network, which is defined by parameters in neural network data store 104. Likewise, feature extractor 304(2) operates on selected image 310 to derive, using convolutions, subsampling, and the like, various arrays and other data elements about content of selected image 310 as feature set 322(2) to neural network instance 320(2). Neural network instance 320(2) determines, from feature set 322(2), what output value 324(2) to output according to its network, which is also defined by parameters in neural network data store 104. In this manner, a "siamese neural network" is implemented.

A comparator 326 compares output value 324(1) and output value 324(2) to determine which is greater (or which is lesser) and outputs a relative metric 328. Relative metric 328 can then be stored as match results in match results data store 112. This can be repeated for multiple images from RDS 110. In this manner, an input image is compared to a plurality of representative images and a relative metric determined for each comparison. Since the images in RDS 110 have corresponding known metrics 308, those can be stored with the comparisons in match results data store 112. The computations needed to derive the output values 324(2) for each of the images in RDS 110 can be performed once and stored and this can be done before the input image is obtained. If the output values are stored for all of the images in RDS 110, then selecting images from RDS 110 based on some filter criteria might comprise selecting which of the prestored output values to use in the comparison done by comparator 326. Then, when a different set of filter criteria is used, all that is needed is to filter the prestored output values and the feature extraction and neural network scoring need not be performed again. In some cases, the output values are determined for some small number of representative images, such as two or more, and then additional output values for additional representative images are generated. In any case, the outputs can be stored for a plurality of representative images prior to operation of feature extractor 304(1) operates on input image 302.

Because the feature extractors and neural network instances are distinct, they can operate on different inputs. Because the feature extractors and neural network instances work in the same way, and because the neural network instances were trained on pairs of input image and their relative metrics, their outputs are comparable and thus can be compared to arrive at a relative metric for their respective inputs.

Figures 4, 5:
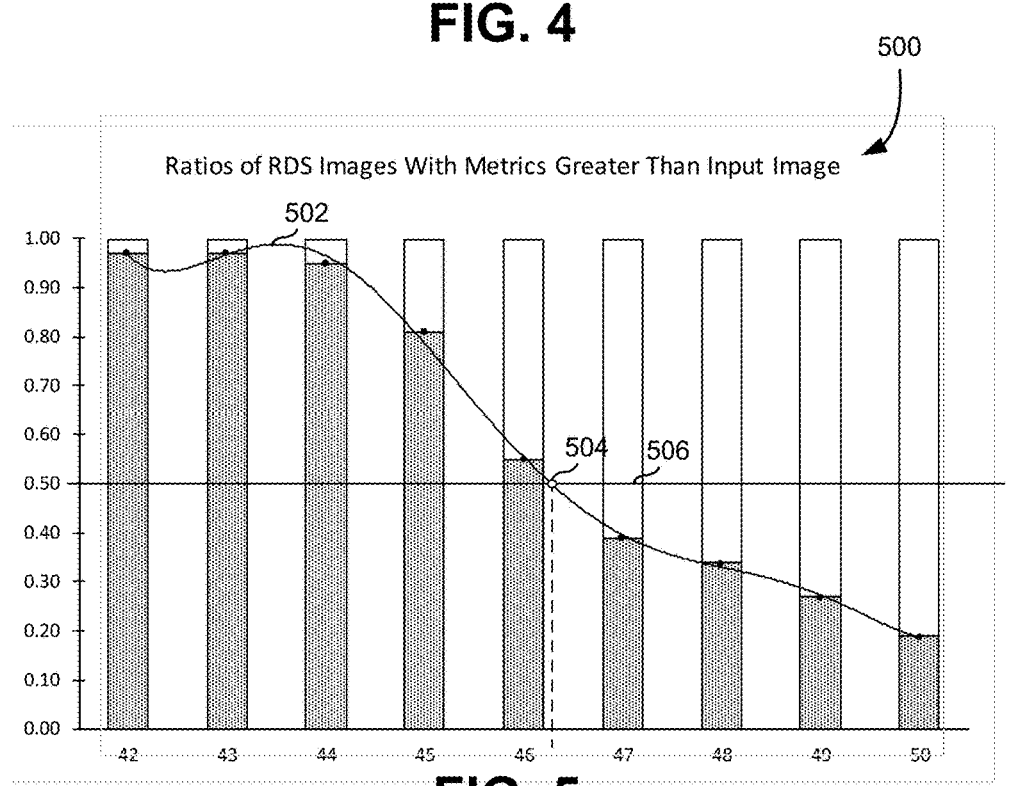
FIG. 4 is a table representing possible match results that might be created by the matching system of FIG. 3.
FIG. 5 is a plot of data from match results of an input image and a representative data set.

FIG. 4 is a table 400 representing possible match results that might be created by the matching system of FIG. 3. In this table, there are k entries. This might be the number of images in the RDS, or it might be smaller than the number of images in the RDS, if not all RDS images were used. For each entry, there is a match number, a metric value, and a relative metric. As an example, the third entry in the table has a match number of 3, a metric value of $M_3$, and a relative metric of M(Input Image)>M(RDS(3)). The match number can be used by various programs and modules to identify records in the table. The metric value of $M_3$ indicates that, for the metric being computed for the input image, the image RDS(3) in the RDS has a known corresponding metric of $M_3$. This information can come from various sources. For example a catalog of known clothing models might have been used to generate images in RDS 110 and the body sizes of those models might have been manually input based on reported or actual measurements. For other metrics, such as weight, height, age, demographics, the known corresponding metrics might similarly be determined by manual input for those images in RDS 110.

The relative metric M(Input Image)>M(RDS(3)) indicates that, when the input image and the RDS(3) image were put through the siamese neural networks, the matching system determined that RDS(3) had a higher metric than the input image. In some implementations, the relative metric is not limited to being a binary choice but is multilevel so that the relative metric reflects not only when one image has a higher score than another, but when the one image has a much higher score than the other image.

Typically, the number of entries, k, is large enough to provide useful results, but not too large as to be difficult to create. For example, k might be 100, 200, 1,000 or some other suitable number. The number of images in RDS 110 might be k images or more than k images, perhaps where not all of the images are used all of the time. In some embodiments, k can be varied in response to matching results. For example, if an input image has an a priori known metric, but the image processing system cannot accurately determine a metric that is consistent with that a priori known metric, then perhaps a larger value of k is needed. On the other hand, if the image processing system is able to consistently and accurately determine a metric that is consistent with that a priori known metric for some value of k, then perhaps a smaller value of k would give the same results with less computational effort.

Given a populated table 400 supplied to evaluation system 114, evaluation system 114 can output a determined metric for the input image. One approach to determining a "determined metric" for an input image is illustrated in FIG. 5. It should be noted that the determined metric need not be the actual metric. For example, the image processing system might operate in an acceptable manner even if sometimes it determines a metric such as a dress size of 45 from an image of a person who was in fact a dress size 46. Thus, the image processing system might not need to always determine actual metrics and it might be sufficient to determine determined metrics and those determined metrics can be used downstream as a proxy for actual metrics. Thus, an ecommerce website might work in a satisfactory manner even though some determined metrics output by the image processing system are not in fact the actual metrics of the person in an image (or more generally, the actual metric of a data object).

FIG. 5 is a plot of data that represents match results of an input image and images of RDS 110. Evaluation system 114 might count the number of images used from RDS 110 by known metric value and then count the number of images having a given metric value that have a relative metric indicating that the image has a lower metric than the input image. In the example shown, the metric is body size and the known corresponding metrics for the images in RDS 110 range from size 42 to size 50. While dress sizes are expressed in these examples using a scale that is used in Europe, it should be understood that many other scales might be used instead or as well.

The number of images for each known corresponding metric might be the same or might vary. For example, RDS 110 might have exactly 50 images with known metrics for each integer dress size from 42 to 50, for a total of k=450 images. The RDS might have some other distribution, such as having more images for harder to discern dress sizes, or having a distribution that was not designed to any particular target distribution.

From the data of table 400, evaluation system 114 can use the match results data to determine a determined metric for the input image. There are a number of approaches. With one approach, a histogram approach, rows of table 400 are "binned" by metric value and for each bin associated with one metric value, a ratio is determined by counting the number of RDS images in that bin for which the relative metric points to the input image rather than the RDS image, then dividing by the total number of RDS images in the bin (regardless of their relative metric). As explained above, the total number of RDS images in each bin can be the same, but that is not required. Thus, for a size S, if there are $S_<$ representative images that have a metric of size S and a relative metric that points to the input image rather than the representative image and $S_>$ representative images that have a metric of size S and a relative metric that points to the representative image rather than the input image, then the ratio would be $R_S=S_</(S_<+S_>)$. This histogram data structure can be used for evaluation of an input image, as described herein.

In a specific example, the representative image set's associated metric is an associated body size value attributed to a person in each image and that is associated with that image. Those images are binned by their body size value. Then, for the images in one bin for one body size, the evaluation system counts the number of those images for which the siamese neural network determined that the input image depicted a person with a larger body size than the image from the representative image set. That determination can be represented by a binary value output by a comparator such as comparator 326 illustrated in FIG. 3.

It might be expected that for an input image of a small person and a bin associated with a higher body size, a large proportion of the relative metrics for the images of that bin would indicate that the input image has a smaller body size than the representative image set image. The evaluation system can compute a percentage of (# of RDS images in that bin for which the comparator indicated a relative metric that pointed to the input image divided by the # of RDS images in that bin) and do this for each bin/body size value. This results in a series of percentages and from this series of percentages, a metric value can be determined for the input image.

FIG. 5 illustrates a plot 500 of such percentages. In that example, for the bin of RDS images having a known dress size metric of 42, around 97% of the relative metrics point to the input image (corresponding to a determination that the person in the input image has a dress size that is likely higher than the dress size of the person depicted in the RDS image) and around 3% of the relative metrics point to the RDS image. Similarly, plot 500 shows that as to the RDS images in the bin for the dress size metric of 50, around 19% of the relative metrics point to the input image and around 81% of the relative metrics point to the RDS image.

Using these percentages, evaluation system 114 can fit a curve 502 to the percentages and find an intersection 504 of curve 502 and a 50% line 506. Intersection 504 can be used as the dress size metric for the input image. In the example of FIG. 5, the input image would be assigned a dress size metric of around 46.4. Thus, 46.4 (or 46 if rounded to a whole integer) would be the presumed dress size value for the person depicted in the input image. A presumed body size could be used as the input body size value, such as being stored as that value or being fed into a clothing ordering system as the user's body size. Of course, it could be that the person depicted actually has a different body size, but for many purposes, the stored input body size value is usable as an indicator of that person's body size anyway.

Fitting curve 502 can be done using a polynomial fit, a bicubic fit, linear fit, or other fit. For example, evaluation system 114 might select the bins with percentages closest to 50% and take an average of the dress sizes of the images in those bins weighted by the percentages.

Other statistical methods might be used, such as determining which integer value for a metric results in closest to a 50-50 split and down weighting percentages that are further from that integer value. In the example of FIG. 5, that might mean that the bins for dress size metrics of 46 and 47 are given more weight than the bins for dress size metrics of 42 and 50. In yet other examples, the comparisons might be ordered and then the mean or median value of all comparisons taken in which outcomes have low confidence value of the pair being non-conclusive.

Figure 6:
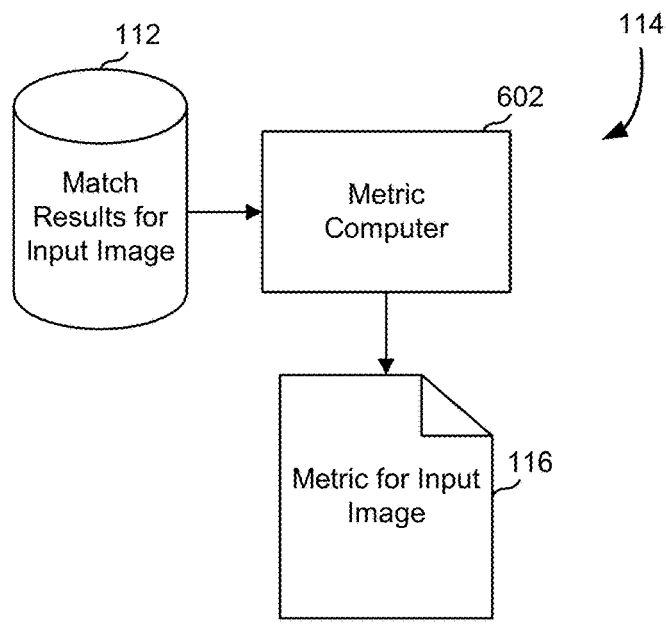
FIG. 6 illustrates operation of an evaluation system that determines a metric for an input image.

FIG. 6 illustrates an example of evaluation system 114 in greater detail. In this example, a metric computer 602 takes as its input data from match results data store 112 and outputs metric 116 for the input image. Metric computer 602 might be implemented in software executed by a processor and might include administrative inputs (not shown) for selecting among different processes for calculating the metric from the match results.

Figure 7:
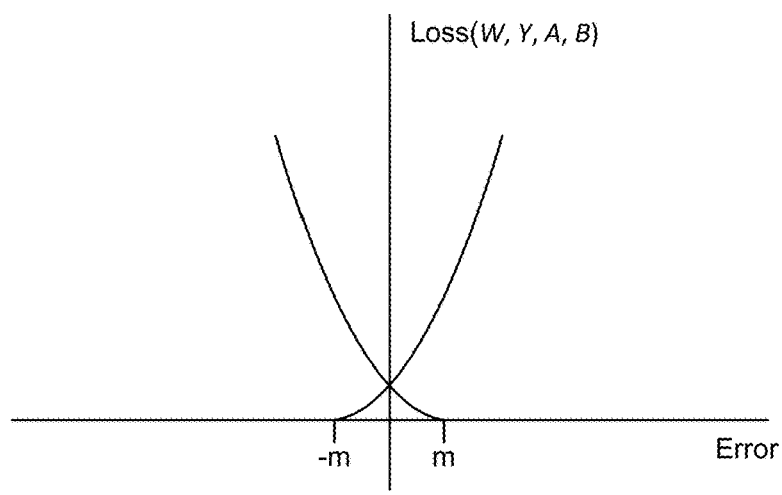
FIG. 7 is a plot of a butterfly loss cost function as might be used in training a neural network.

FIG. 7 is a plot of a butterfly loss cost function as might be used in training the neural network. As described above with reference to FIG. 3, a siamese neural network can be used to determine relative metrics of pairs of images. For training the neural network, the network is presented with pairs of images having known relative metrics and each of the two branches of the siamese neural network is provided with an image or features extracted from an image and outputs a value that is compared with the output value of the other branch. When the siamese neural network gets it wrong, i.e., reports a relative metric that is opposite of the known relative metric for an image pair of the training set, that is an error and the network is trained by adjusting for that error.

The error function corresponds to a cost function referred to herein as a butterfly loss function, for comparing objects and deriving the neural network parameters. For example, the overall loss function might be the sum of the loss functions for the siamese neural network indicating that an image A has a higher metric than image B when in fact image A has a lower metric than image B, and vice versa. This is illustrated by Equation 1, where W refers to the parameters of the neural network, A and B are image vectors and Y is the relative metric of images A and B.

$$\text{Loss}(W,Y,\vec{A},\vec{B}) = \text{Loss}_> + \text{Loss}_< \quad \text{(Eqn. 1)}$$

Equation 1 can be expressed as in Equation 2 when Y is a binary value of 0 or 1. In Equation 2, when Y is a binary value, one of the two error terms will be multiplied by zero and thus have no effect.

$$\text{Loss}(W,Y,\vec{A},\vec{B}) = Y^* \text{Error}_> + (1-Y)^* \text{Error}_< \quad \text{(Eqn. 2)}$$

Equation 3 provides more detail where m is a margin (to allow for some small margin of error) and $D_W$ is an error term.

$$\text{Loss}(W,Y,\vec{A},\vec{B}) = \tfrac{1}{2}(Y^*\{\max(0,m+D_W)\}^2 + (1-Y)^*\{\max(0,m-D_W)\}^2) \quad \text{(Eqn. 3)}$$

With all the training set of image pairs, the neural network parameters are determined. In some variations, separate sets of neural network parameters are used, each for different categories, such as clustering training images into categories for different age/gender/race groups to possibly obtain better homogeneity between test examples. In such a system, when the relative metrics are obtained for the training set, other characteristics might be obtained. For example, where the relative metrics are determined manually using the arrangement shown in FIG. 2, the user interface might also ask for entry of filter data fields, such as age and gender.

Where such filtering is used and known for the training set, it might also be used for the input images and the RDS images. It may be that filter data fields for the RDS images are already known and those for the input image need to be determined. In some embodiments, the filter data fields are determined for the input image and the RDS images. This can be done by using employing classifier engines (such as a haar cascade engine, a softmax classifier, an SVM-based classifier, or the like), so that there is a preprocessing to filter the input image into a suitable subset.

The particular metric might vary based on application. For example, the metric might relate to a characteristic that is not normally numerical but that is represented numerically, or perhaps as an enumerated value. A few additional examples include determining metrics corresponding to age, gender, body type, height, weight, attractiveness, outfit comparisons (e.g., determining a value for how "stylish" an outfit worn in an image is), dress occasion estimation (e.g., determining how formal the clothing is for a person depicted in an image).

While many examples herein describe a training set of image pairs wherein the relative metrics for those image pairs are obtained by querying a human evaluator, other methods might be used as well, or instead. For example, a weight measuring device such as a scale or weight measuring floor covering might be placed in a high traffic area and, with permission of persons passing over the weight measuring device, capture their picture and their weight. This can be done anonymously or with some anonymization feature, as the identity of the persons is not important. What is important is the collection of a large number of images and a weight associated with that image. That collection of images can be used for training the neural networks as to weight directly if the desired metric is weight, or as to clothing size with weight being a close proxy for clothing size.

The systems and processes herein might be used for more abstract characteristics, such as doing pairwise comparisons to determine which of two outfits is better or which if two video clips is more interesting. The objects being input to the system for metric determination need not be images of people, as previously explained. The inputs might be images that have no persons depicted. For example, the training set might be two images of outdoor scenes where the relative metric for the two images is which of the images depicts a warmer outdoor temperature. From an appropriate training set, the system might be able to determine a likely temperature reading based on features that a feature extractor and scoring neural network would pick up on such as the type of weather, cloud patterns, lighting, etc. As another example, images of birds might be the inputs and the metric is a likely size of the bird depicted. The training set in that case might be pairs of images of birds with a relative metric for each pair indicating which bird is larger (or in the case of nonbinary relative metrics, which bird is larger and whether that larger bird is a little larger, somewhat larger, or very much larger than the other bird).

Other examples of objects that might be processed for determining a likely metric for those objects might include three-dimensional images, video (e.g., score videos for their interest, their relationship to a particular topic, their cinematic quality).

Figure 8:
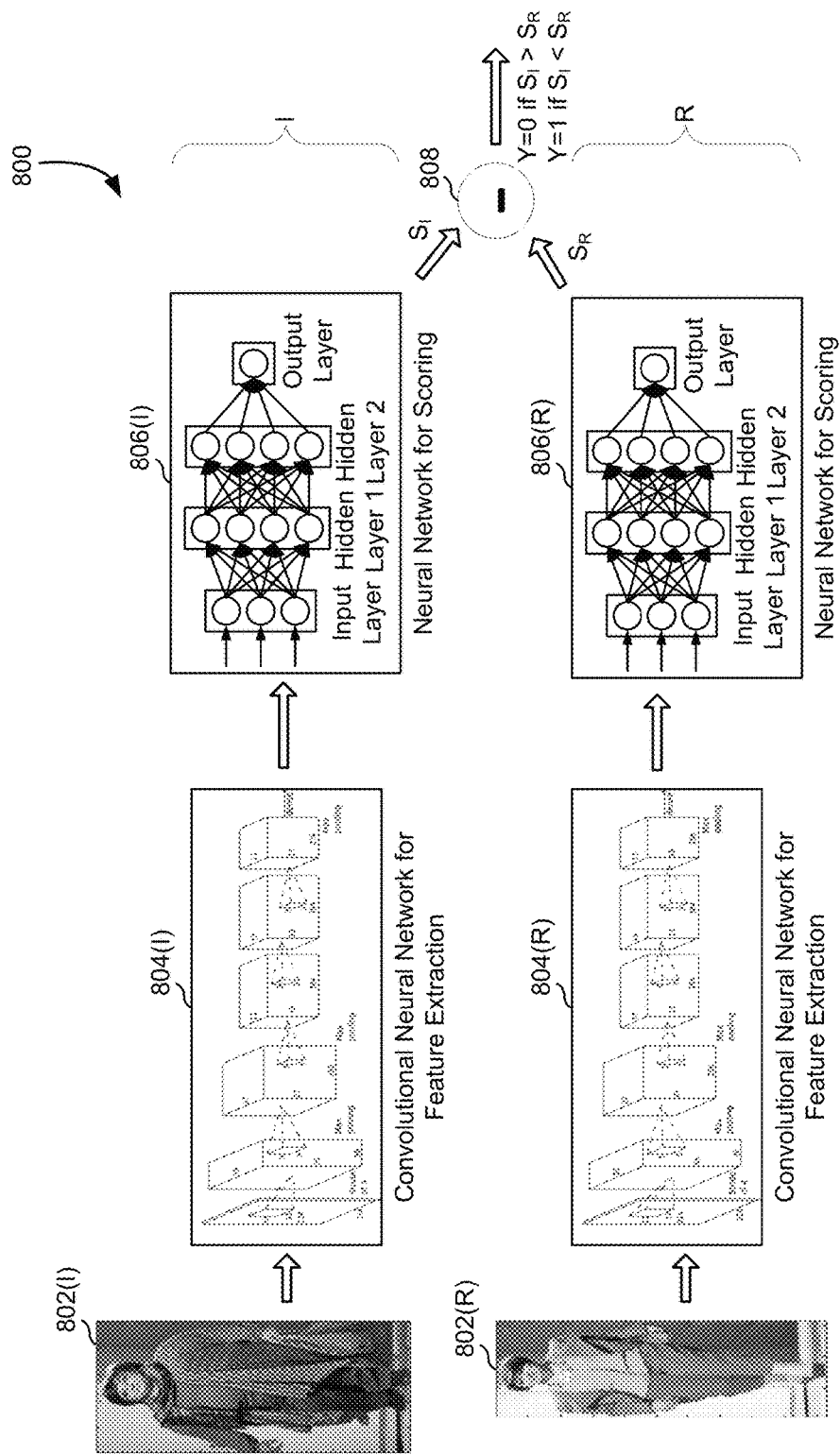
FIG. 8 illustrates how relative metrics might be determined for pairs of images, using a trained neural network and feature extractor.

FIG. 8 illustrates how relative metrics might be obtained from pairs of images and using a trained neural network and feature extractor in additional detail. A system 800 illustrated there might be implemented as software executed by a processor, or by dedicated hardware. In operation, system 800 reads an input image 802(I) and a representative image 802(R), then applies those to their respective feature extractors 804(I) and 804(R).

In a neural network, values at some nodes affect values at other nodes. In a simple case, the value at an "output" node might be a function, such as a weighted sum, of the values at a plurality of "input" nodes. In some neural network processing, there are several layers of input/output nodes, so that the value of a node is a function of the values of some other nodes and that value is in turn used to influence the value at some other node closer to an output of a neural network. The set of weights might be used in performing the weighted sum so that values at some input nodes have more influence on the value at an output node than other input nodes. Where an edge between a given input node and a given output node represents the fact that a value at the given input node has an effect on the value at the given output node, a weighted edge represents how much that effect would be. More generally, a weight or strength of an edge between a first node and a second node represents an amount of influence the value at the first node has on the value at the second node. In training a neural network, the weights on edges can be adjusted to improve the overall output of the neural network.

For example, training a neural network might involve starting with an initial set of neural network parameters (nodes, edges between particular nodes, weights of particular edges, etc.), and, via a neural network computation process, generating an output based on some input values. Where the input values and the expected output value is known, a difference between the expected output value and the actual output value, referred to as an error value, can be determined. In training, the set of neural network parameters are adjusted to reduce that error value. For example, if the strength of a given edge is raised and the error value goes down, the weight for that given edge is set at a higher weight. Likewise, if the strength of a given edge is raised and the error value goes up, the weight for that given edge is set at a lower weight. Given sufficient numbers of inputs and known/expected outputs, the trained neural network can take as an input some input values with an unknown output value and output an output value that corresponds to those input values.

In a specific example, a neural network might comprise a first input layer, one or more first hidden layers, a first output layer, a second input layer, one or more second hidden layers, and a second output layer. A set of weighted edges are deployed between nodes of the first hidden layers and between nodes of the second hidden layers. Training the neural network can be done by adjusting the set of weighted edges based on score outputs by the first output layer when a first data object is applied to the first input layer and by the second output layer when the second data object is applied to the second input layer. A comparison of the first score output and the second score output to the relative metric for the first data object and the second data object would give an indication of whether there is an output error. The set of weighted edges can then be adjusted to reduce that output error.

In the case of image pairs of persons having body sizes, if the neural network is trained from a set of pairs of images and known relative body sizes as between the images of a pair, the neural network can output a relative size as between two images of a pair with a previously unknown relative body size for the pair.

For a convolutional neural network feature extractor, subsampling and convolution distills down features to a set of weights, that can then be supplied to the input layer of their respective neural networks 806(I) and 806(R) illustrated in FIG. 8. Neural network 806(I) might include a set of nodes that form a first input layer, one or more first hidden layers, and a first output layer, with weighted edges connecting nodes. Neural network 806(R) might include a set of nodes that form a second input layer, one or more second hidden layers, and a second output layer, with weighted edges connecting nodes. Neural networks 806(I) and 806(R) might use the same weights for their hidden layers. The output layer of neural network 806(I) provides a value $S_I$ to a comparator 808, while the output layer of neural network 806(R) provides a value $S_R$ to comparator 808. Comparator 808 can then output Y=0 if $S_I<S_R$ and Y=1 if $S_I>S_R$. Where the relative metrics stored in the match results are not limited to binary values of Y, comparator 808 can output a nonbinary value. For example, comparator 808 might output a normalized value such as $(S_I-S_R)/(S_I+S_R)$.

The results of the "R" path can be pre-computed, so that the values of $S_R$ for each of, or many of, the RDS images are already known. In such cases, only the "I" path need be executed. Where there are privacy concerns with respect to the input image, these are easily addressed, perhaps by having part of the feature extraction happening local to a user submitting an input image.

The processes and systems described herein can be applied beyond just image processing of body sizes or the like. The processes and systems described herein might replace a regression type system that depends on estimating metrics. The metrics do not have to be continuous and might be for age, gender, body type, height, weight, attractiveness, outfit comparisons, dress occasion estimation. Other applications beyond clothing and styling could benefit from these processes and systems. For example, an image processing described herein might be used to determine a measure of how well an outfit works, which video clips are more interesting, etc. Two images or objects can be compared by determining metrics for each by comparing each of them to the representative data set and then comparing the resulting metrics. For example, a comparison between an object A and an object B would be done through an ensemble, C, of samples that can be chosen to represent most relevant object A sample and object B sample. In such a system, object A will be compared to 1,000 objects of ensemble C and then object B will be compared separately to the same 1,000 objects of ensemble C. The final result will be provided by the comparison of a number of votes in which object A was greater than the one of C relative to the number of votes in which object B was greater than the one of C. The proportion can be treated or used as a confidence ratio for an A versus B comparison.

Improvement in comparing A vs B can be made by imposing attributes on the chosen set C. For example, if the body type of the person is known, then comparing using only C images of the specified body type can steer the majority vote properly and contribute to more robust result.

Similarly, accuracy might be enhanced if age is considered and only appropriate images are picked for the C ensemble. Multiple attributes can be used to further refine the voting results by "anding" a multitude of relevant attributes. The proposed approach doesn't require additional retraining of the system, as the attributes might be imposed easily on the C set by picking appropriate samples.

Figure 9:
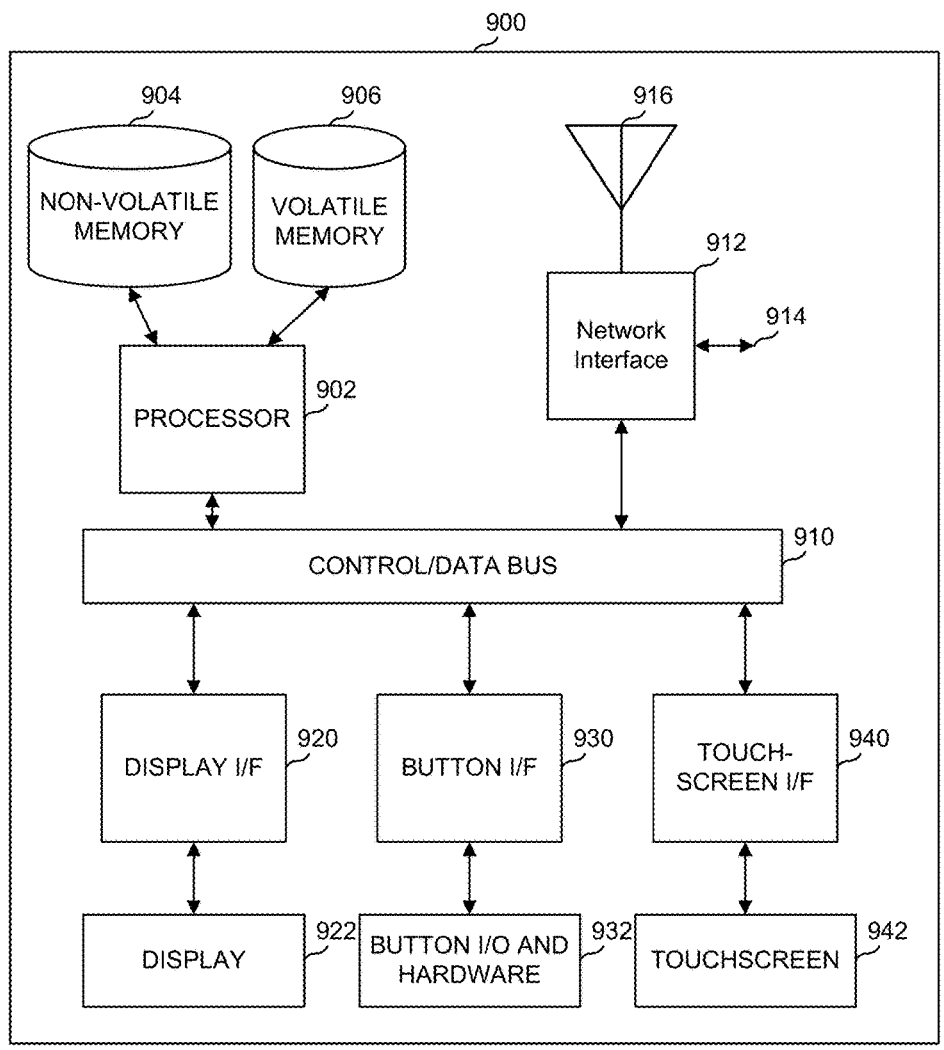
FIG. 9 illustrates an environment in which various embodiments can be implemented.

FIG. 9 illustrates aspects of an example environment 900 for implementing aspects in accordance with various embodiments. In some embodiments, various modules and structures referenced herein are implemented in software, such as by having a processor that executes program code read from a nontransitory program memory store where the program code includes instructions implementing those modules/structures.

As shown, example environment 900 includes a processor 902, non-volatile memory 904 for storing constants and program code, volatile memory 906 for storing variables in use by processor 902, and a control bus 910 for processor 902 to use to obtain inputs and provide outputs. As shown, those include a network interface 912 that might connect to a network via a network interface 914 or wirelessly via an antenna 916. Other interfaces include a display interface 920 for interfacing to a display 922, a button interface 930 for interfacing with button inputs/outputs and hardware, and a touchscreen interface 940 for interfacing with a touchscreen 942. Some of these elements are not required. For example, where processor 902 can operate without user input, some of the elements shown in FIG. 9 can be omitted.

Examples of environments include personal computers, laptop computers, tablet computers, embedded computer systems, and the like. In a typical arrangement, a server for image processing performs the image processing, such as determining a metric for an image, but in other environments, it might be done on a user client device.

The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as example environment 900 could be part of a web server that receives requests and serves content in response thereto, that might be related to determining a metric for an image.

Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The example environment can include any appropriate hardware, software and firmware for integrating with the data store as needed to execute aspects of one or more features described herein. The interface to example environment 900 might be entirely over network interface 912, such as by having example environment 900 implement a web server interface. The handling of requests and responses, as well as the delivery of content can be handled using PHP: Hypertext Preprocessor ("PHP"), Python, Ruby, Perl, Java, HTML, XML, JSON, and/or another appropriate server-side structured language.

Operations described herein as being performed by a single device may, unless otherwise clear from context, be performed collectively by multiple devices, which may form a distributed and/or virtual system.

Non-volatile memory 904 and volatile memory 906 can include several separate data tables, images, image databases, neural network parameters, dynamic data storage schemes and/or other data storage mechanisms and media for storing data relating to a particular aspect of the present disclosure.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of example environment 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims. While the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with computer-executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon computer-executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for programmatically determining, from an input image, a body size of a person depicted in the input image, the method comprising:
    accessing a neural network trained using a training set, the training set comprising a plurality of image pairs, wherein an image pair is a data structure comprising (1) a first training image depicting a first training image person, (2) a second training image depicting a second training image person, and (3) a relative body size value that is a binary value indicative of whether the first training image person likely has a larger body size than the second training image person;
    accessing a stored set of representative images, wherein the stored set of representative images comprises a first representative image having a first associated body size value of a first representative person depicted in the first representative image and a second representative image having a second associated body size value of a second representative person depicted in the second representative image;
    deriving, using the neural network, from the input image and the first representative image, a first input relative body size value indicative of a first relative body size as between the person depicted in the input image and the first representative person;
    deriving, using the neural network, from the input image and the second representative image, a second input relative body size value indicative of a second relative body size as between the person depicted in the input image and the second representative person; and
    deriving, from the first input relative body size value, the second input relative body size value, the first associated body size value, and the second associated body size value, an input body size value that is usable as a representation of the body size of the person depicted in the input image.

2. The computer-implemented method of claim 1, wherein the stored set of representative images comprises a plurality of representative images, each representative image having an associated body size value of a representative person depicted in the representative image and wherein deriving the input body size value comprises:
    deriving, using the neural network, a plurality of input relative body size values, wherein an input relative body size value represents a relative body size as between the person depicted in the input image and a representative person depicted in a representative image of the plurality of representative images;
    generating a histogram data structure having bins for each distinct associated body size value of the representative images of the plurality of representative images;
    for each bin, determining a first count of a number of representative images of the plurality of representative images for which the input relative body size value as between such representative images and the input image is a first value;
    for each bin, determining a second count of a number of representative images of the plurality of representative images for which the input relative body size value as between such representative images and the input image is a second value;
    for each bin, determining a ratio of the first count divided by a sum of the first count and the second count;
    calculating, from the ratios for the bins and the distinct associated body size values for the bins, a presumed body size value for the input image; and
    storing the presumed body size value as the input body size value.

3. The computer-implemented method of claim 2, wherein calculating the presumed body size value comprises:
    fitting a curve to a plot of the ratio for each bin versus the associated body size value for that bin;
    determining an intersection of the curve to a plot of a dividing line corresponding to a ratio of 0.5;
    identifying an intersection body size that corresponds to where the intersection is in the plot; and
    using the intersection body size as the presumed body size value.

4. The computer-implemented method of claim 1, further comprising:
    creating a training set by, for each image pair,
        a) displaying the first training image and the second training image of said each image pair;
        b) accepting an evaluator input from an evaluator indicative of a human evaluator's determination of relative body size as between the first training image person and the second training image person; and c) assigning the relative body size value of said each image pair according to the evaluator input; and training the neural network using the training set to generate a set of neural network parameters that are usable in a neural network computation process that generates outputs as a function of input values and the set of neural network parameters, wherein the set of neural network parameters comprises a set of weights between nodes of the neural network wherein a weight between a first node and a second node of the neural network defines a strength of an influence of the first node on the second node and wherein training comprises adjusting the set of weights to reduce an error function that is a function of differences, for given neural network inputs, between expected neural network outputs and actual neural network outputs.

5. A system, comprising:

one or more processors;

a plurality of representative data objects and a unique metric value associated with each representative data object of the plurality of representative data objects;

memory to store computer-executable instructions that, if executed, cause the one or more processors to:
  a) access a neural network trained using training set data, the training set data comprising a plurality of data object pairs, wherein a data object pair of the training set data comprises (1) a first data object having an associated first metric, (2) a second data object having an associated second metric, and (3) a relative metric, wherein the relative metric is a binary value indicative of which of the first metric and the second metric likely is larger than the other, wherein the first metric is a numeric value representative of a characteristic of the first data object and wherein the second metric is a numeric value representative of a characteristic of the second data object;
  b) access the plurality of representative data objects and their unique metric values;
  c) derive match results that represent comparisons of an input data object with each matched representative data object comprising, for a given matched representative data object:
    i) deriving, using the neural network, an input relative metric indicative of a relative metric as between the input data object and the given matched representative data object;
    ii) accessing the associated unique metric value associated with the given matched representative object; and
    iii) updating the match results based on the input relative metric and the associated unique metric value; and
  d) derive, from the match results, an input metric value that is usable as a representation of a metric for the input data object.

6. The system of claim 5, wherein the memory to store computer-executable instructions includes further instructions that, if executed, cause the one or more processors to:
  a) access the training set data; and
  b) train the neural network using the training set data to generate a set of neural network parameters that are usable in a neural network computation process that generates outputs as a function of input values and the set of neural network parameters, wherein the set of neural network parameters comprises a set of weights between nodes of the neural network wherein a weight between a first node and a second node of the neural network defines a strength of an influence of the first node on the second node and wherein training comprises adjusting the set of weights to reduce an error function that is a function of differences, for given neural network inputs, between expected neural network outputs and actual neural network outputs.

7. The system of claim 5, wherein matched representative data objects comprise fewer than all of the plurality of representative data objects and the matched representative data objects comprise representative data objects that match a filter criteria.

8. The system of claim 5, further comprising the neural network and wherein the memory to store computer-executable instructions includes further instructions for deriving, using the neural network, the input relative metric indicative of the relative metric as between the input data object and the given matched representative data object, the further instructions comprising instructions for:
  precomputing first neural network outputs for the given matched representative data object independent of the input data object;
  storing the first neural network outputs;
  computing second neural network outputs for the input data object; and
  comparing the first neural network outputs and the second neural network outputs.

9. The system of claim 5, wherein the plurality of data object pairs comprises a plurality of image pairs, the plurality of representative data objects is a plurality of representative images, the input data object is an input image, and the given matched representative data object is a given representative image.

10. The system of claim 9, wherein the input metric value for the input image and the metric values of the representative images correspond to characteristics of those respective images and wherein the input image and the plurality of representative images are images of persons depicted therein and wherein the characteristics comprise one or more of clothing size, body size, age, height, or weight of the persons depicted therein.

11. The system of claim 9, further comprising the neural network, wherein the neural network comprises:
  a first feature extractor for extracting features from the input image;
  a second feature extractor for extracting features from the given representative image;
  a first neural network layer set, comprising a first input layer, one or more first hidden layers, and a first output layer, with a first set of weighted edges between nodes of the first neural network layer set;
  a second neural network layer set, comprising a second input layer, one or more second hidden layers, and a second output layer, with a second set of weighted edges between nodes of the second neural network layer set; and
  a comparator for comparing a first output of the first output layer and a second output of the second output layer.

12. The system of claim 11, further comprising storage for a plurality of second outputs from a plurality of given representative images that can be stored prior to operation of the first feature extractor and the first neural network layer set.

13. A method for computing, for an input data object, an input metric value that is usable as a representation of a metric for the input data object, the method comprising:

accessing a training set comprising a plurality of data object pairs, wherein an data object pair of the training set comprises (1) a first data object having an associated first metric, (2) a second data object having an associated second metric, and (3) a relative metric, wherein the relative metric is a binary value indicative of which of the first metric and the second metric likely is larger than the other, wherein the first metric is a numeric value representative of a characteristic of the first data object and wherein the second metric is a numeric value representative of a characteristic of the second data object;

operating a neural network, wherein the neural network comprises a first input layer, one or more first hidden layers, a first output layer, a second input layer, one or more second hidden layers, and a second output layer, wherein a set of weighted edges are deployed between nodes of the first hidden layers and the set of weighted edges are deployed between nodes of the second hidden layers;

training the neural network by adjusting the set of weighted edges based on a first score output by the first output layer when the first data object is applied to the first input layer, a second score output by the second output layer when the second data object is applied to the second input layer, and a comparison of the first score output, the second score output, and the relative metric for the first data object and the second data object;

applying an input data object to the first input layer to obtain an input data object score output of the first output layer;

accessing a first representative data object from a plurality of representative data objects and a second representative data object from the plurality of representative data objects;

applying the first representative data object to the second input layer to obtain a first representative data object score output of the second output layer;

recording a first relative metric for the first representative data object corresponding to a relation between the input data object score output and the first representative data object score output;

applying the second representative data object to the second input layer to obtain a second representative data object score output of the second output layer;

recording a second relative metric for the second representative data object corresponding to a relation between the input data object score output and the second representative data object score output; and deriving, from the first relative metric and the second relative metric, the input metric value.

14. The method of claim 13, further comprising:

recording additional relative metrics for additional representative data objects in relation to the input data object, each additional relative metric corresponding to relative metrics of the input data object score output and score outputs of the additional representative data objects; and deriving, from the first relative metric, the additional relative metrics and metrics for data objects of the plurality of representative data objects, the input metric value.

15. The method of claim 14, wherein the first representative data object and the additional representative data objects each meet a set of filter criteria when the input data object meets the set of filter criteria.

16. The method of claim 13, wherein score outputs of the second output layer are recorded prior to input of the input data object, thereby having the score outputs of the second output layer precomputed and independent of the input data object.

17. The method of claim 13, wherein score outputs of the second output layer are selected based on filter criteria and wherein score outputs for different filter criteria are selected without requiring recomputation of the score outputs.

18. The method of claim 13, wherein the input data object is an input image and applying the input data object to the first input layer comprises extracting first features from the input image and applying the first features to the first input layer, and wherein the first representative data object is a representative image and applying the first representative data object to the second input layer comprises extracting second features from the representative image and applying the second features to the second input layer.

19. The method of claim 18, wherein each data object pair in the training set is a pair of images and the relative metric for the pair of images is a binary value indicative of which of the pair of images likely has a larger associated metric, wherein associated metrics of images correspond to characteristics of those respective images.

20. The method of claim 19, wherein the input image and the representative image are images of persons depicted therein and wherein the characteristics comprise one or more of clothing size, body size, age, height, or weight of the persons depicted therein.

* * * * *

UNITED STATES PATENT AND TRADEMARK OFFICE
CERTIFICATE OF CORRECTION

PATENT NO. : 10,210,627 B1
APPLICATION NO. : 15/413255
DATED : February 19, 2019
INVENTOR(S) : Ilia Vitsnudel et al.

Page 1 of 1

It is certified that error appears in the above-identified patent and that said Letters Patent is hereby corrected as shown below:

On the Title Page

Item (72) Inventors:
Currently reads as:
"(72) Inventors: Ilia Vitsnudel, Mountain View, CA (US); Ilya Vladimirovich Brailovskiy, Even, Yehuda, (IL)"

Should read as:
--(72) Inventors: Ilia Vitsnudel, Even, Yehuda, (IL); Ilya Vladimirovich Brailovskiy, Mountain View, CA (US)--

Signed and Sealed this
Sixteenth Day of April, 2019

Andrei Iancu
*Director of the United States Patent and Trademark Office*